(No Model.) 2 Sheets—Sheet 1.

C. M. CONRADSON.
ELECTRIC LOCOMOTIVE.

No. 487,114. Patented Nov. 29, 1892.

Witnesses:
James D. Duhamel.
Horace A. Dodge.

CONRAD M. CONRADSON,
Inventor.
by Dodge Sons,
Attys.

(No Model.) 2 Sheets—Sheet 2.

C. M. CONRADSON.
ELECTRIC LOCOMOTIVE.

No. 487,114. Patented Nov. 29, 1892.

Witnesses:
James P. Duhamel
Horace A. Dodge.

CONRAD M. CONRADSON,
Inventor,
by Dodge Sons,
Attys.

THE NORRIS PETERS CO., PHOTO-LITHO., WASHINGTON, D. C.

UNITED STATES PATENT OFFICE.

CONRAD M. CONRADSON, OF MADISON, WISCONSIN.

ELECTRIC LOCOMOTIVE.

SPECIFICATION forming part of Letters Patent No. 487,114, dated November 29, 1892.

Application filed December 2, 1891. Serial No. 413,790. (No model.)

*To all whom it may concern:*

Be it known, that I, CONRAD M. CONRADSON a citizen of the United States residing at Madison in the county of Dane and State of Wisconsin have invented certain new and useful Improvements in Electric Motors of which the following is a specification:

My invention relates to electric motors, and though designed more particularly for use in connection with the propulsion of vehicles, is applicable to electric motors generally, and particularly to such as are employed in connection with hoisting machinery and the like.

The object of the invention is to combine in a motor the advantages of geared and gearless motors, that is to say, to so construct and arrange the parts that adequate power may be had for starting the motor, for ascending steep grades, and for drawing heavy loads; and so also that when the load is started the use of gearing may be discontinued, and a positive or rigid connection made between the rotating armature and the driven shaft.

Figure 1:
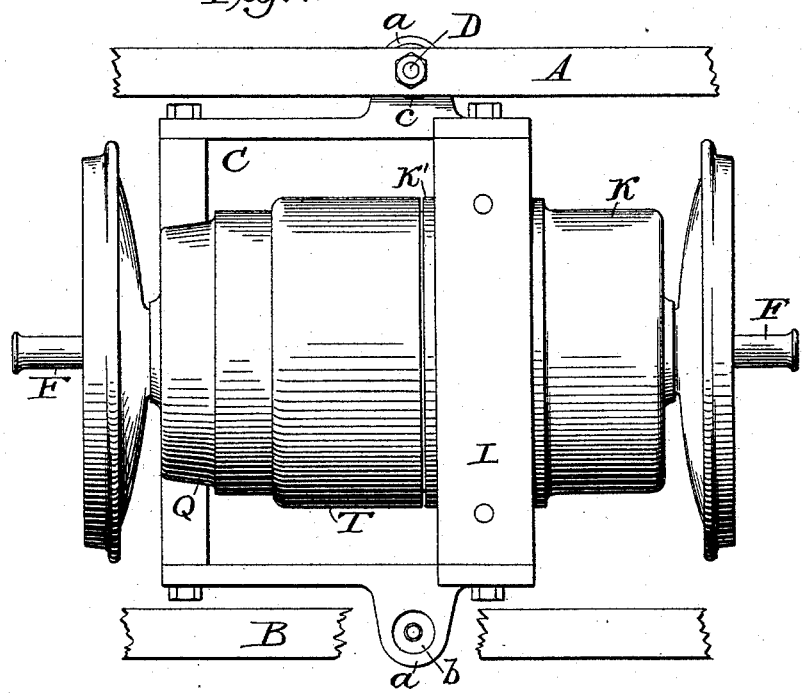
Figure 2:
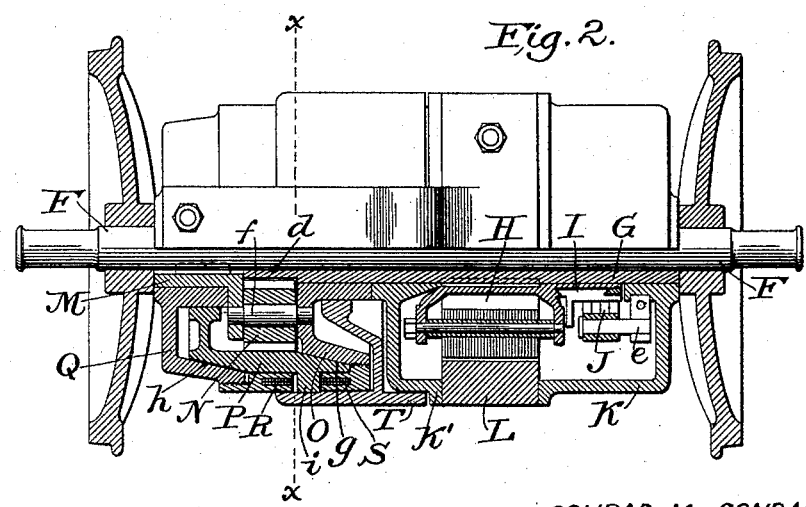
Figure 3:
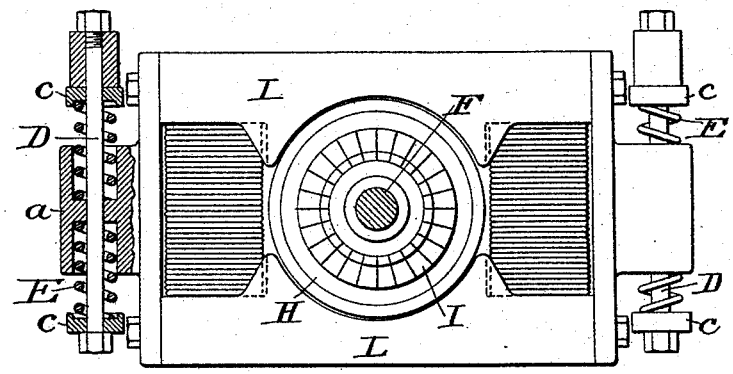

In the accompanying drawings,—Figure 1 is a top plan view of my improved motor as applied to a car axle; Fig. 2, a face elevation of the same partly in section; Fig. 3, an end elevation of the motor at right angles to the axis of the shaft or axle; and Fig. 4, a section on the line $x$—$x$ of Fig. 2.

In the drawings I have represented, and in the following description I shall refer to the motor as applied to a car axle, but it is to be understood that throughout the description said axle stands for and represents a driven shaft of any kind or in any place.

The details of construction of the motor are immaterial, that is to say, any well known type of motor may be employed; either one of those in which the armature rotates relatively to the field magnets, or one in which the field magnets rotate relatively to the armature, though I have shown and prefer the first-mentioned plan.

Referring to the drawings,—A and B indicate cross timbers of a car, from which is suspended a frame C, which carries the shell or casing of the motor, and which is suspended beneath the timbers A and B by rods or bolts D.

To properly support or sustain the shell of the motor, the rods D are arranged to pass through ears $a$ formed upon the bars of the frame C, and provided with sockets or cavities $b$ to receive springs E, Fig. 3, which, projecting above and below the ears $a$, and occupying a position between washers or plates $c$ and the ears, give to the frame C an elastic support, and take up the jar and concussion incident to travel over uneven places. The bolts or rods D are designed to take the principal weight of the shell or casing of the motor and the field magnets, but said shell is further sustained from or by the axle, as will be presently explained.

Figure 4:
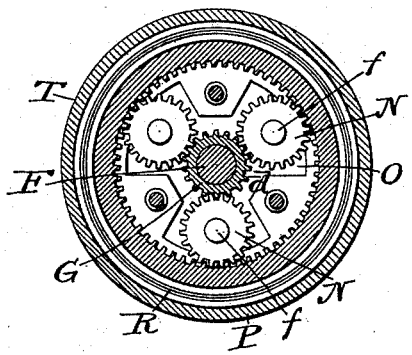

F indicates the axle or shaft to which power is to be applied, and closely encircling or free to rotate upon or about said shaft or axle, is a sleeve G, one end of which terminates in or is provided with a pinion $d$, Figs. 2 and 4.

Keyed or otherwise made fast to the sleeve G is the armature H of the motor, to which is attached and with which rotates the commutator cylinder I, as usual; these parts being constructed in any common and well known manner, and being here represented only in conventional form.

J indicates one set of commutator brushes carried by a stem or support $e$, which is in turn supported by the hub of a section K of the shell or casing carried by the frame C, as above mentioned.

L indicates the field magnet or magnets encircling or partially encircling the armature H. These magnets are carried by the shell or casing K K', which latter is formed with hubs or collars to encircle and closely fit upon the tube G, as plainly shown in Fig. 2. Hence the field magnets are sustained not only by the rods or bolts D, but also by the shell or casing K K' and tube G, and consequently by the axle or shaft F. In this way the axle is relieved of the bulk of the weight of the motor, which is transferred to the rods D and springs E, while the motor is kept in proper relation to the axle, and the armature and field magnets of the motor are maintained in proper relation to each other.

M indicates a flanged collar keyed to the axle or shaft F, and serving as a support for the journals or axles $f$ of a series of pinions N, the opposite ends of which journals or axles are carried by a spider or annular head O. The spider or head O encircles and is free to turn upon the sleeve G, or the latter is free to turn within the hub of the spider or head O, as the case may be. The outer face of the spider or head O is inclined or tapered as shown in Fig. 2, to constitute it one member of a friction clutch, as hereinafter explained.

The pinions N N mesh with the pinion $d$ of sleeve G and also with the teeth of an internally-toothed annular gear wheel P, shown in cross section in Fig. 2, and having two inclined or tapering faces $g$ and $h$,—an internal face to correspond and make frictional contact with the inclined face of the head or spider O, and an external face $h$ to similarly make contact with and bind upon the internal face of a shell Q, the hub of which encircles the flanged sleeve M, and the body of which is carried by the frame C, so that it is firmly held against rotation.

The annular gear wheel P is formed with a circumferential enlargement $i$, which occupies a position between two powerful electro-magnets R and S, formed by winding insulated wire of proper size in annular grooves formed in bands of soft iron respectively encircling and screwed or otherwise made fast upon the spider or head O and the shell Q. These electro-magnets R and S are normally de-energized or inactive, but when the magnet R is excited or energized it attracts the circumferential enlargement $i$ of the annular gear wheel P, and draws the conical face $h$ thereof into frictional contact with the corresponding face of the shell Q with force sufficient to cause the two to lock together. The shell Q being a fixture, it follows that when the wheel P and shell Q are thus locked together, the wheel P will become a fixture also, and consequently if motion be imparted to the pinions N which mesh with the teeth of wheel P, said pinions must revolve around the axle or shaft F, or in other words travel around the inner toothed face of wheel P. If on the other hand, the magnet R be de-energized, and the magnet S energized or excited, the annular enlargement $i$ of wheel P will be attracted by the magnet S, and the tapering or inclined face $g$ of said wheel will be brought into frictional contact with the corresponding face of the shell or head O, and the wheel P will be locked fast to said head. Under these conditions it will be seen that if a current of electricity be supplied through the brushes J of the motor to the armature, said armature will rotate and will carry with it under all circumstances the sleeve G and pinion $d$.

If the magnet S be energized so that the wheel P is made fast or locked to the spider or head O, then of course the wheel P can only rotate in unison with the head O, and of course with the sleeve M, since the head O and sleeve M are rigidly connected by the axles $f$ of the pinions, and if need be, by additional bolts or rods; and inasmuch as the sleeve M is firmly keyed to the shaft of axle F, it follows that under this adjustment of parts, the armature, the sleeve G, head O, wheel P, sleeve M, and axle A, with the intermediate pinions N, will all travel as one, and without any action of the gear wheels or pinions as such,—they being under these circumstances locked together and having no independent movement. Hence it will be seen that whenever the magnet S is energized the axle or shaft A will make as many revolutions as does the armature H.

When it is desired to start the motor and consequently the load, or when great power is required, as in ascending steep grades or drawing heavy loads, it is desirable to gear down or reduce the speed, and in so doing increase the power applied to the axle or shaft. In such case the magnet S is de-energized, and the magnet R is excited or energized, whereupon the circumferential enlargement $i$ of wheel P is attracted by magnet R, and the conical or tapering face $h$ of said wheel is thrown into frictional contact with the corresponding face of shell Q, and the wheel becomes firmly locked to said fixed shell. The armature and sleeve rotating as before, impart rotary motion to the pinions N through the pinion $d$, and said pinions N rotating about their axles, and being in engagement or mesh with the teeth of the now fixed gear wheel P, revolve about the shaft or axle, carrying with them the head O and sleeve M, which latter being keyed to the axle or shaft F, carries the latter with it. The motion thus given to the shaft or axle is of course much slower than the motion of the armature, because a portion of the speed is lost through the travel of the pinions N around or about the shaft or axle; but just in proportion as speed is lost, increased power is applied to the axle.

The frictional surfaces of the parts O, P, and Q may be smooth or roughened as desired, and of any suitable material, though it is preferred in practice to make them reasonably smooth, and of metal.

The manner of conducting the current to the motor and to the magnets R and S is unimportant, and may be varied as desired.

By varying the strength of the current employed to energize the magnets, they may be caused to hold the wheel P with greater or less force, and to prevent or permit slipping between the parts according as it is desired to obtain the full speed or power, or to affect a variation thereof between extremes. For this purpose a rheostat of any ordinary construction may be introduced into the circuit of the electro-magnets.

The spaces between the electro magnets and the circumferential projection $i$ of the gear wheel P are covered by a band or shell T in order that dust and moisture may be excluded.

It is obvious that the precise form of the electro magnets is immaterial, and that the gearing may be varied, and any well known form of transmitting gear or differential gear may be substituted for that shown, the invention consisting broadly in interposing between the armature or rotary member of an electric motor and the shaft to be driven, a system of gearing or variable speed mechanism by which the driven shaft and the rotating member of the motor may be caused to move as one, or the motion of the shaft may be varied or made different from that of the rotating member of the motor as required. This idea I mean to claim broadly and regardless of details.

When both electro magnets, R and S, are deenergized, the wheel P will be free to rotate without transmitting motion to the shaft or axle.

Having thus described my invention, what I claim is:—

1. In combination with a shaft or axle to be driven, an electric motor, and gearing substantially such as shown and described, interposed between the motor and the shaft or axle and adapted, at the will of the attendant, to positively lock together the rotating member of the motor and the shaft or axle, and thereby to cause the two to move as one; or to transmit motion from the rotating member of the motor to the shaft or axle through intermediate moving parts and at a different rate of speed from that of the rotating member of the motor.

2. In combination with an electric motor and with a shaft to be driven, intermediate gearing substantially such as described and shown for transmitting motion differentially from the moving member of the motor to the shaft, and a clutch adapted to lock together the moving member of the motor, the shaft, and the gearing and to cause said parts to rotate as one.

3. In combination with the shaft or axle, a sleeve encircling the same and provided with a pinion, an electric motor consisting of a fixed and a rotating member, said rotating member being secured to said sleeve, a pinion rotating with said sleeve, a second pinion meshing with the first, and carried by a sleeve or head keyed to the axle or shaft, an annular gear wheel encircling the shaft or axle and meshing with the second pinion, a fixed shell or head, and means substantially such as shown for causing the annular gear wheel to be locked to the pinion-carrying head or sleeve, or to the fixed shell or head at will, whereby the shaft or axle may be made to move at the same speed with, or at a different speed from, the movable member of the motor.

4. In combination with shaft or axle F, sleeve G provided with pinion $d$; armature H carried by said sleeve; field magnet L, and means for supplying electric current to the armature; sleeve M made fast to shaft or axle F; head or spider O connected to sleeve M; pinion N carried by sleeve M, and head O; fixed shell Q; and gear-wheel P adapted to be thrown into engagement with head or spider O or with shell Q at will.

5. In combination with shaft or axle F, sleeve G provided with pinion $d$ and armature H; sleeve M and head O; pinion N; fixed shell Q, and annular gear wheel P; electro magnets R S, adapted to move the wheel P into engagement with spider or head O or with shell Q, as one or the other magnet is energized.

In witness whereof, I hereunto set my hand in the presence of two witnesses.

CONRAD M. CONRADSON.

Witnesses:
W. R. BAGLEY,
C. H. ALLYN.